May 5, 1936. V. C. RUSSELL 2,039,934
CHURN
Filed Jan. 17, 1935
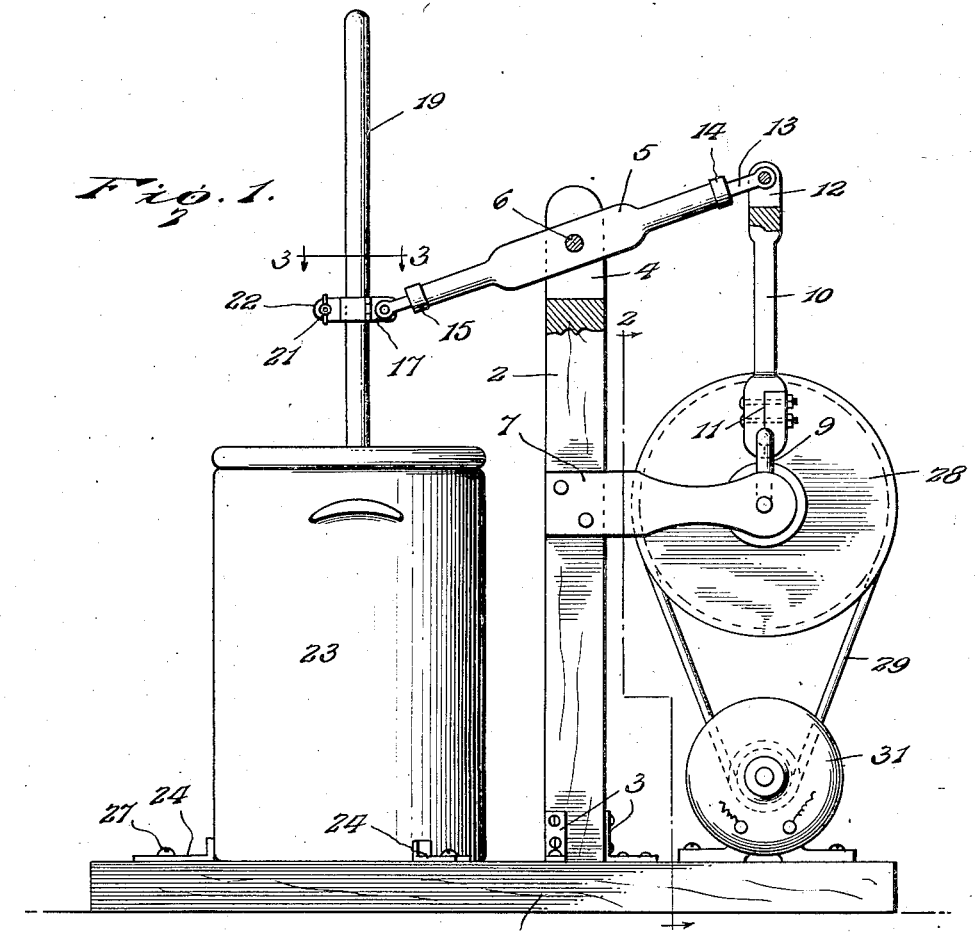
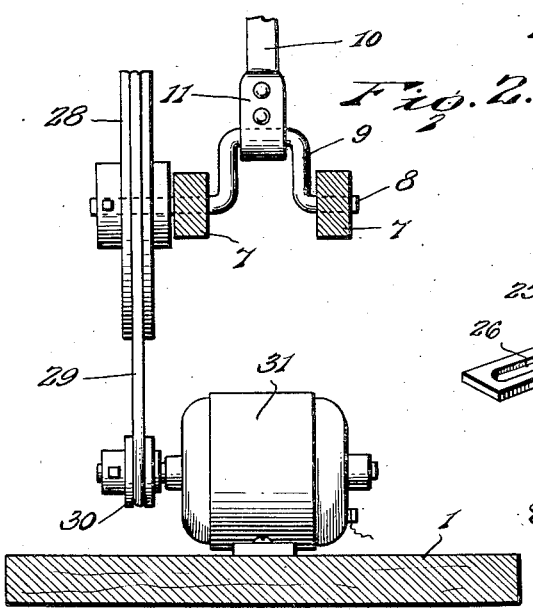
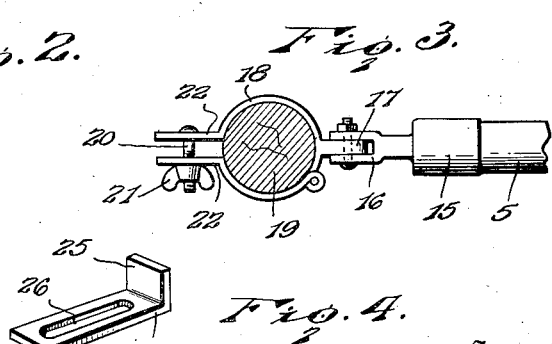
Inventor
V. C. Russell.
By Lacy & Lacy,
Attorneys Patented May 5, 1936

2,039,934

UNITED STATES PATENT OFFICE 2,039,934

CHURN

Vesper C. Russell, Red Boiling Springs, Tenn.

Application January 17, 1935, Serial No. 2,281

1 Claim. (Cl. 259—113)

This invention seeks to provide a churn-operating mechanism of simple and compact construction which will operate efficiently without requiring the constant attention and vigilance of an attendant. The invention is illustrated in the accompanying drawing and consists in certain novel features which will be hereinafter first fully described and then more particularly defined in the appended claim.

In the drawing:

Figure 1 is a side elevation with parts in section of an apparatus embodying the present invention.

Figure 2 is a transverse section on the line 2—2 of Figure 1.

Figure 3 is an enlarged horizontal section on the line 3—3 of Figure 1.

Figure 4 is a detail perspective view of a bracket or foot which is employed.

In carrying out the present invention, there is provided a base 1 which may be of any preferred material and dimensions. Upon this base there is erected a standard 2 secured to the base by right angular brackets 3 and having its upper end bifurcated, as shown at 4, to receive the intermediate portion of a rocking arm or lever 5 pivoted in the standard by a pin 6. At an intermediate point in the height of the standard, brackets or arms 7 are secured and in the free ends of these arms is mounted a shaft 8 having a crank 9 between the arms, as clearly shown. A connecting bar 10 is disposed between the lever 5 and the crank 9 and has its lower end engaged around the crank by a split bearing 11, as shown and as will be understood. The upper end of the connecting bar is formed into a yoke or fork 12 within which is pivoted a stem 13 extending from the end of the lever 5 and held thereto by a ferrule 14. At the opposite end of the lever is secured a ferrule 15 from which extends a clevis 16 receiving and pivoted to a lug 17 on a split collar 18. Said split collar 18 encircles the dasher rod or staff 19 and is held firmly around the same by a clamping bolt 20 and wing nut 21 fitted through mating flanges or ears 22 on the collar, as will be understood upon reference to Figure 3. The lower end of the staff 19 carries a dasher, as will be understood, playing in the jar or churn body 23.

The churn body or jar is held in proper position upon the base 1 by brackets or feet 24 having an upturned inner end, as shown at 25, adapted to bear against the side of the jar and provided with longitudinal slots 26 in their basal members through which fastening screws or bolts 27 are inserted into the base. The longitudinal slots 26 permit the brackets to be adjusted so as to engage around and hold a jar of any desired diameter.

Upon one end of the crank shaft 8 is secured a pulley 28 having an annular groove in its periphery and a belt 29 is trained about the pulley within said groove and about a smaller driving pulley 30 on the shaft of a small electric motor 31, said motor being secured rigidly upon the base in any preferred manner.

From the foregoing description, taken in connection with the accompanying drawing, it will be seen that I have provided a very simple and compact mechanism which will operate very efficiently to drive a churn so that butter will be quickly produced therein. Inasmuch as the mechanism will be driven mechanically, it will not be necessary for an attendant to remain at the churn constantly while it is in use. The connection between the driving lever and the elements cooperating therewith permit the mechanism to operate smoothly and easily at all times and the dasher staff will be very securely connected with the operating lever, although it may be very readily detached therefrom when the churning has been completed.

Having thus described the invention, what is claimed as new is:

A churn mechanism including a base, a standard rising from the base and having its upper end bifurcated, arms secured at opposite sides of the standard and projecting laterally from the standard below the bifurcated upper end thereof, a crank shaft journaled through the arms with its crank between the arms and one end portion projecting outwardly from an arm, a pulley on the outwardly projecting end portion of the crank shaft, a walking beam pivotally mounted in the bifurcated end of the standard, a stem extending from one end of the walking beam over the crank of said crank shaft, a connecting bar having a bifurcated upper end straddling said stem and pivotally connected thereto and having a bearing at its lower end engaged about the crank arm of the crank shaft, a clevis at the other end of the walking beam, a clamp pivoted in the clevis and adapted to be tightly secured about a dasher staff and reciprocate the staff vertically when the walking beam is in motion, a motor mounted on the base beneath the crank shaft, a pulley carried by said motor, and a belt engaged about the pulleys of the motor and crank shaft for rotating the crank shaft whereby the walking beam will be rocked for moving the dasher staff.

VESPER C. RUSSELL.